(12) United States Patent
Wharton

(10) Patent No.: US 6,227,918 B1
(45) Date of Patent: May 8, 2001

(54) SYSTEM FOR DETERMINING APPARENT SLIP AND ANGLE OF ATTACK

(75) Inventor: Mark E. Wharton, 5030 Graceland Blvd., Racine, WI (US) 53406

(73) Assignee: Mark E. Wharton, Racine, WI (US)

( * ) Notice: Subject to any disclaimer, the term of this patent is extended or adjusted under 35 U.S.C. 154(b) by 0 days.

(21) Appl. No.: 09/475,573

(22) Filed: Jan. 5, 2000

(51) Int. Cl.$^7$ ................................................ B63H 20/00
(52) U.S. Cl. ................................................ 440/2; 340/984
(58) Field of Search .......................... 440/1, 2; 701/21; 340/971, 984, 945; 416/36, 38, 40, 41

(56) References Cited

U.S. PATENT DOCUMENTS

| | | |
|---|---|---|
| 3,287,965 | 11/1966 | Brahm et al. . |
| 3,686,485 | 8/1972 | Wiley et al. . |
| 3,906,437 | 9/1975 | Brandwein et al. . |
| 3,960,012 | 6/1976 | Ingram . |
| 3,972,224 | 8/1976 | Ingram . |
| 4,152,645 | 5/1979 | Bendler . |
| 4,334,425 | 6/1982 | Crane . |
| 4,459,671 | 7/1984 | Teass et al. . |
| 4,475,380 | 10/1984 | Colovas et al. . |
| 4,787,053 | 11/1988 | Moore . |
| 4,843,575 | 6/1989 | Crane . |
| 5,043,727 | 8/1991 | Ito . |
| 5,142,473 | * 8/1992 | Davis ............................ 364/424.01 |
| 5,928,040 | 7/1999 | Wharton . |
| 5,997,250 | * 12/1999 | Carter, Jr. et al. ..................... 416/27 |

* cited by examiner

Primary Examiner—Sherman Basinger
(74) Attorney, Agent, or Firm—Michael Best & Friedrich LLP

(57) ABSTRACT

A system for measuring propeller apparent slip and angle of attack includes a main console housing a processor. The system measures vessel speed with a pitot tube, pressure transducer, and the processor; and measures engine speed with an inductive pickup and the processor. The processor is programmed with algorithms for determining apparent slip and angle of attack. When the engine gear ratio, propeller diameter, and propeller pitch are manually provided to the processor, the processor computes apparent slip and angle of attack on a substantially real-time basis. The processor routes information to a display screen in the main console, and also to a data logger for permanent data storage.

20 Claims, 4 Drawing Sheets

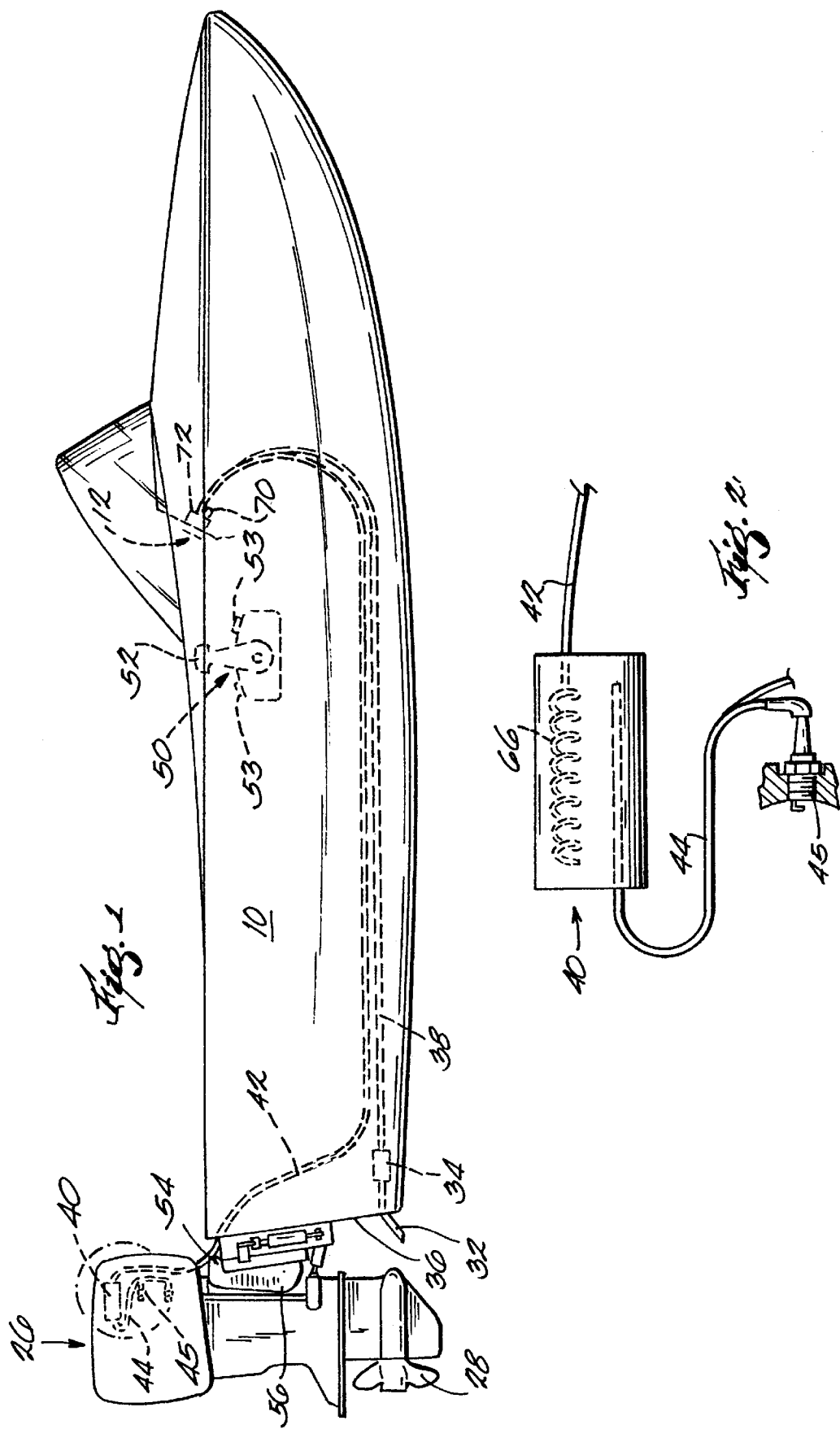

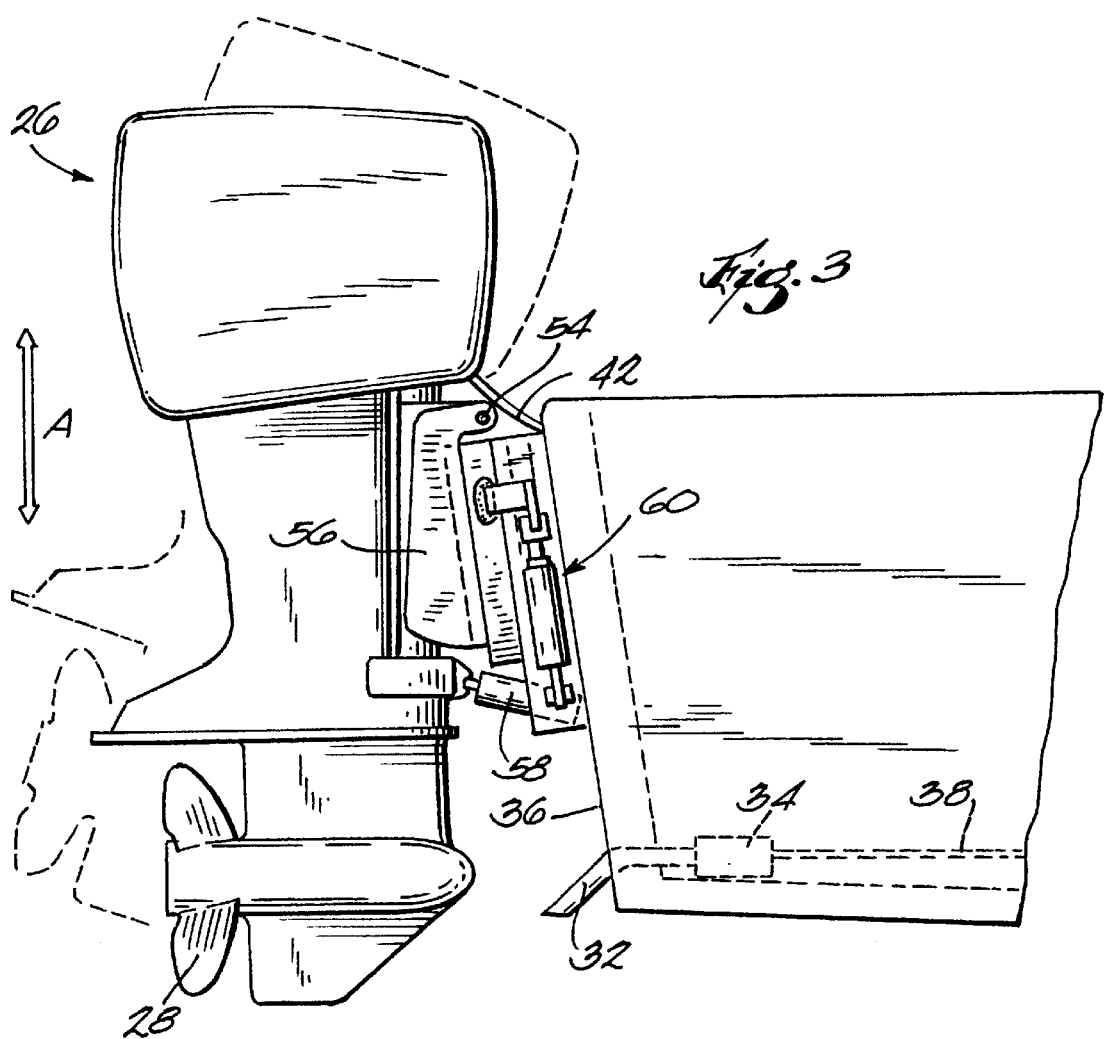
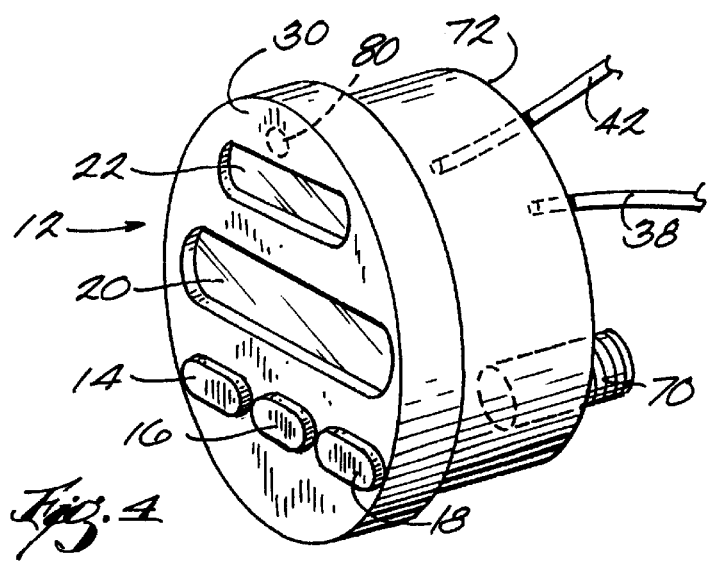

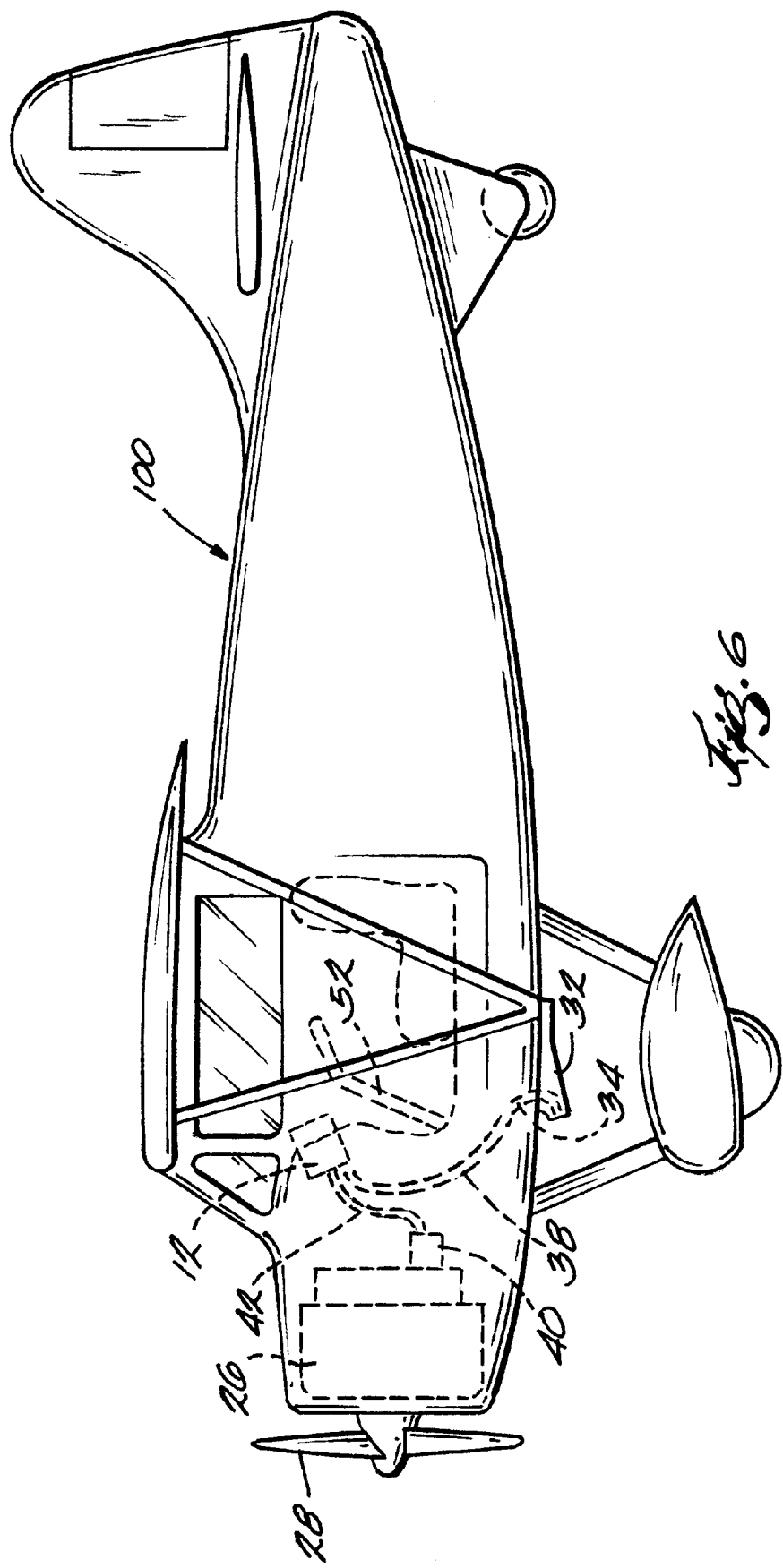

SYSTEM FOR DETERMINING APPARENT SLIP AND ANGLE OF ATTACK

BACKGROUND OF THE INVENTION

This invention is an improvement over the system described and claimed in my U.S. Pat. No. 5,928,040, issued Jul. 22, 1999. This invention relates to the operation of a vessel having a propeller, and more particularly to a system for determining and displaying the real-time apparent slip and angle of attack for the vessel's propeller, as well as recording the same information for analysis at a later time.

Theoretical propeller advance in a non-yielding fluid is equal to the propeller's pitch multiplied by the number of rotations of the propeller. Apparent slip is the percentage of theoretical propeller advance lost in a yielding fluid, such as water or air. While apparent slip is not a direct measure of propeller efficiency, there is a strong correspondence between the two quantities. All other things being equal, as apparent slip is reduced, vessel speed increases.

Angle of attack is the difference between the theoretical and actual blade path for a rotating propeller blade. Angle of attack is necessary for a rotating propeller blade to generate the thrust also known as "lift") that moves the vessel. The angle of attack of a propeller blade causes a pressure differential between the opposite-facing surfaces of the propeller blade in the same manner that a wing or hydrofoil creates a pressure differential above and below the wing or hydrofoil as it moves through air or water. A propeller having no angle of attack will provide no thrust. The optimum range of angle of attack for a propeller blade is between about 3° and 5°. A propeller operating outside of this optimum range may cause excessive propeller slip or may cause the vessel's engine to operate outside the manufacturer's recommended range of engine speeds.

Traditional systems for monitoring motor vessel performance focus on the fuel efficiency of the motor vessel engine. None of these traditional systems provide an accurate measurement of apparent slip and angle of attack.

In propeller-driven vessels (e.g., fishing boats, water ski boats, remotley-controlled model airplanes and boats, and commercial and private airplanes), apparent slip and angle of attack are important factors in overall vessel performance. For some professional, personal, and recreational activities, the apparent slip and angle of attack of the vessel's propeller directly impact the success one might have in those activities.

For example, in sports fishing, most tournaments are structured such that all teams are allotted the same amount of time on a body of water. It is in a fishing team's interest to have a fishing boat equipped with a propeller that is operating with optimal apparent slip and angle of attack. The team that can move from location to location on the water the fastest, and therefore spend the greatest portion of its allotted time fishing, has the best odds of catching a greater number of large fish and winning the tournament.

Therefore it is desirable to provide a system that measures and records data relating to propeller apparent slip and angle of attack, and that allows comparison of apparent slip and angle of attack for different propellers and under different conditions.

SUMMARY OF THE INVENTION

The invention provides a system for measuring propeller apparent slip and angle of attack for a propeller-driven vessel moving through a fluid medium. The system includes means for determining the vessel speed, means for determining engine speed, and a main console. Vessel speed is preferably determined by a pitot tube and pressure transducer or by any other reliable means. Engine speed is preferably determined by an inductive pickup interconnected with a spark plug wire, or by any other reliable means.

The main console houses a processor that is programmed with algorithms for determining apparent slip and angle of attack, and is also programmed to measure elapsed time. The main console may include a display screen on which any one of the input quantities or elapsed time can be displayed at a given time. The processor receives input data, uses the data to determine apparent slip and angle of attack for the vessel's propeller, and may display apparent propeller slip and/or angle of attack on a display screen. The measured and calculated values for apparent slip and angle of attack are used to determine on a substantially instantaneous or real-time basis the effect an adjustment of the vessel's operating parameters (e.g., tilt and height of the engine in a marine application) has on the apparent slip and angle of attack of the vessel's propeller.

The system also includes a recording feature for recording inputs and outputs to and from the processor, as well as elapsed time, for later analysis. Therefore several different propellers may be tested, and the test data may be stored to later determine which propeller operates at the best relative apparent slip and angle of attack. Also, test data for apparent slip and angle of attack as affected by changing vessel parameters (e.g., tilt and height of the engine in marine applications) can be recorded to determine the optimal settings for such parameters.

The system also includes a data downloading feature that allows for downloading of data stored in the processor to a data logger so the data can be transferred to a computer for further analysis. Processor memory can then be cleared to allow for more testing and recording.

One object of the present invention is to determine and display real-time propeller apparent slip and angle of attack information.

Another object of the present invention is to provide data for determining the optimal settings for various vessel parameters to obtain the optimal apparent slip and angle of attack for a given propeller.

Another object of the present invention is to provide data that can be used to compare the apparent slip and angle of attack of different propellers on a given vessel under the same or similar conditions and vessel parameters.

Another object of the present invention is to allow for recordation of real-time information relevant to propeller apparent slip and angle of attack for later analysis.

Another object of the present invention is to provide a method for determining the optimal settings for various vessel parameters to obtain the optimal apparent slip and angle of attack for a given propeller.

Another object of the present invention is to provide a method for comparing the apparent slip and angle of attack of different propellers on a given vessel under the same or similar conditions and vessel parameters.

Other features and advantages of the invention will become apparent to those skilled in the art upon review of the following detailed description, claims, and drawings.

BRIEF DESCRIPTION OF THE DRAWINGS

FIG. 1 is a side view of a marine motor vessel embodying the invention.

FIG. 2 is an enlarged side view of the area encircled in FIG. 1.

FIG. 3 is a partial side view of the stern portion of the vessel depicted in FIG. 1.

FIG. 4 is a perspective view of the main console portion of the invention.

FIG. 6 is a side view of an airplane embodying the invention.

Figure 5:
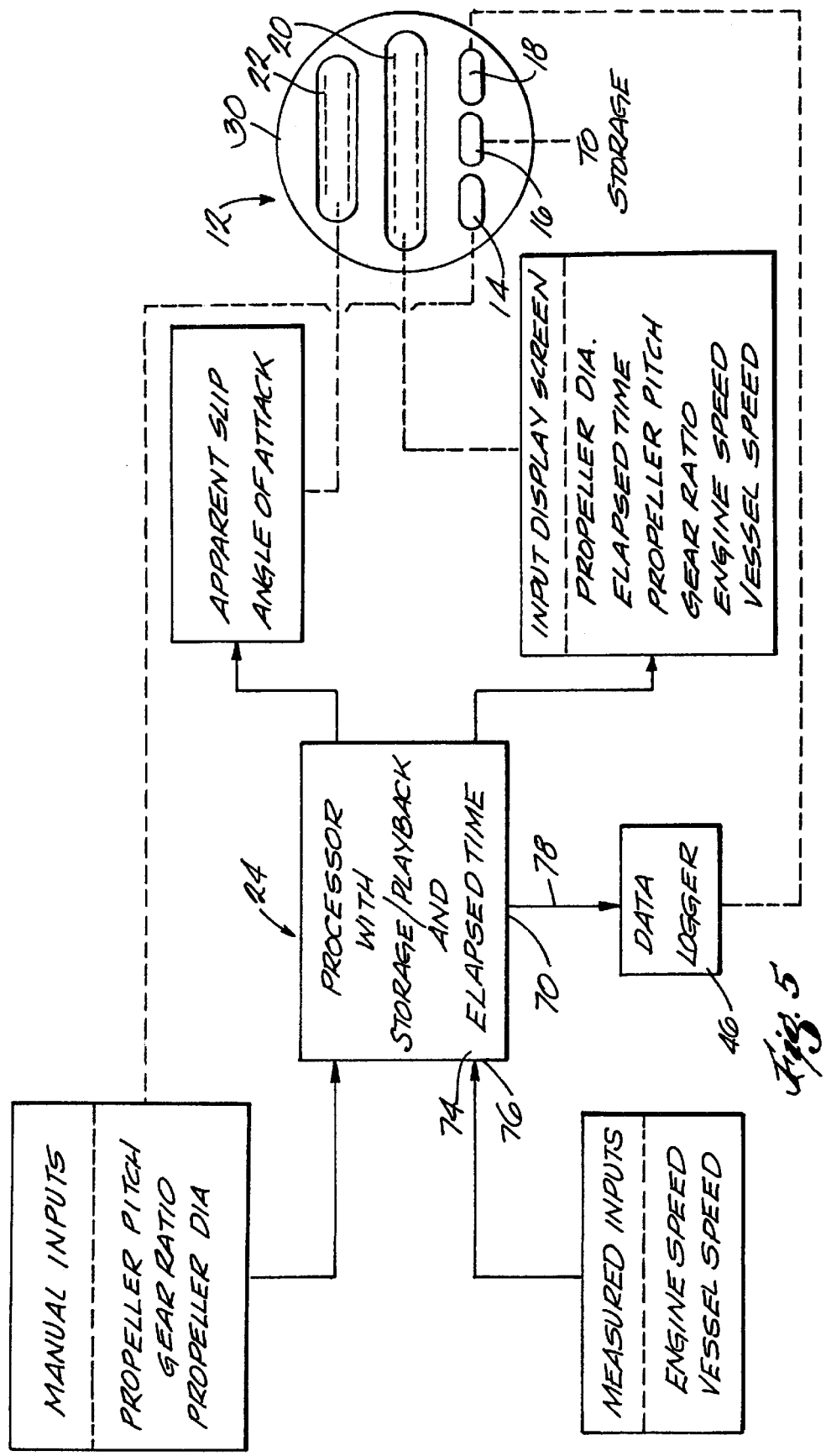
FIG. 5 is a schematic block diagram of the invention.

Before embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

The present invention is intended to be used in any propeller-driven vessel operating in a fluid medium. For example, the present invention may be used with a propeller-driven airplane (FIG. 6) having one or more propellers, as described below. The present invention may also be used on a marine motor vessel having one or more propellers, including so-called air boats using a large fan to propel the boat across a body of water as well as boats having conventional submerged propeller blades. The present invention may also be used in scale models of airplanes and marine vessels, such as remotely-controlled model airplanes and boats.

As seen in FIG. 1, a marine motor vessel 10 has an engine or motor 26, which rotates a propeller 28. Vessel 10 is equipped with a main console or gauge 12 and control panel 50. Control panel 50 includes a handle 52 for controlling the speed of vessel 10, and also control switches 53 that are used to control the tilting, raising, and lowering features of engine 26 with respect to vessel 10.

Referring to FIG. 3, the tilting feature of engine 26 is provided by a tilting mechanism having a pivot pin 54 interconnected with engine 26. Pivot pin 54 is journaled in bracket 56 and allows for rotation of engine 26 about a horizontal axis transverse to the longitudinal axis of vessel 10.

Engine 26 may be tilted from the position shown in solid lines to the position shown in broken lines by actuation of a conventional hydraulic cylinder 58 that abuts against engine 26 at a point below pivot pin 54. Hydraulic cylinder 58 may be actuated between a retracted position in which engine 26 is in the position shown in solid lines to an extended position in which hydraulic cylinder 58 urges engine 26 to the position shown in broken lines. Hydraulic cylinder 58 is controlled by one of the control switches 53 located on control panel 50 (see FIG. 1). Engine 26 will rotate from the position shown in broken lines to the position shown in solid lines under its own weight when hydraulic cylinder 58 is actuated from the extended position to the retracted position.

Still referring to FIG. 3, the raising and lowering feature of engine 26 is accomplished by a raising and lowering mechanism, or hydraulic transom 60. Hydraulic transom 60 is a conventional hydraulic transom, and may be actuated in the directions indicated by line A, from a retracted position at which engine 26 is lowered with respect to vessel 10 to an extended position at which engine 26 is raised with respect to vessel 10. Hydraulic transom 60 is connected to bracket 56, which is hingedly connected to engine 26 by pin 54.

Referring to FIG. 4, main console 12 has buttons 14, 16, 18 on the front face 30 thereof that facilitate manual input of data, and manual operation of the recording, input display, and downloading features described below. Alternatively, main console 12 may have a single button or another arrangement of buttons. The main console 12 may have no buttons, and may be adapted to interface with a laptop computer, with the computer keyboard facilitating manual input of data.

Main console 12 also features an input display screen 20 for displaying a selected input value, and an output display screen 22 for displaying apparent slip and angle of attack. In alternative constructions, a single screen may take the place of screens 20, 22. Alternatively, the main console 12 may not include the display screens 20, 22, which may be particularly desirable for model airplanes and boats embodying the invention, as described below.

Main console 12 houses an electrical circuitry, processor, or microprocessor 24 (shown schematically in FIG. 5) which receives data from the manual data entry button 14 and from the input sensors as described below. Processor 24 is also programmed with algorithms for determining apparent slip and angle of attack as described below, and is programmed to permit measuring elapsed time.

The system requires manual input of values for the engine gear ratio, the propeller blade diameter, and the propeller pitch. These quantities are constant numbers for a given engine 26 and propeller 28, and are easily obtained from the engine and propeller owner's manuals. The manual inputs are entered via button 14 on face 30 of main console 12. See FIG. 4.

In the preferred embodiment, button 14 allows manual input of propeller pitch, propeller diameter, and engine gear ratio through a menu-driven program, with input options being displayed on input display screen 20. Manually actuating button 14 increases the values for propeller pitch, propeller diameter, and gear ratio by preset increments until the desired values are reached. Button 14 may then be pressed in a different manner (e.g., holding button 14 down for a preset time period or pressing button 14 twice in rapid succession) to enter the displayed values for propeller pitch, propeller diameter, and gear ratio into the processor memory. Button 14 is also facilitates the input display feature described below.

Referring to FIG. 1, vessel speed is determined by way of a pitot tube 32 interconnected with the transom 36 or other convenient location on vessel 10. While vessel 10 moves across a body of water, pressure rises or drops in pitot tube 32 as a function of the speed of the vessel. The first input sensor is a conventional pressure transducer 34 interconnected with pitot tube 32. Pressure transducer 34 converts the pressure in pitot tube 32 to an electrical signal. The electrical signal is sent from pressure transducer 34 to processor 24. The electrical signal may be sent by any suitable means 38 such as a wire, a fiber optic cable, or any other means for transferring an electrical signal.

As shown in FIG. 4, means 38 reaches processor 24 by passing through the rear surface 72 of main console 12 and reaching an input terminal 74 on processor 24 (see FIG. 5). Processor 24 converts the electrical signal to a vessel speed in miles per hour. It should be noted that there are many other ways to measure the speed of a marine motor vessel, including, but not limited to, radar, global positioning via satellite, loran, etc, and the invention is intended to be used with any means for measuring the real-time speed of vessel 10.

Referring again to FIG. 1, the second input sensor is a conventional inductive pickup device 40 that produces an electrical signal that processor 24 converts to a measurement of engine speed. In the preferred embodiment, inductive pickup device 40 is clamped around or directly fastened to a primary or equivalent spark plug wire 44 of a spark plug 45 of engine 26. As best seen in FIG. 2, inductive pickup device 40 produces an electrical signal in a conventional manner by way of an inductive coil 66 positioned adjacent to spark plug wire 44.

The electrical signal is sent from inductive pickup device 40 to processor 24 by any suitable means 42, such as a wire, a fiber optic cable, or any other means for transferring an electrical signal. As shown in FIG. 4, means 42 reaches processor 24 by passing through the rear surface 72 of main console 12 and reaching an input terminal 76 on processor 24 (see FIG. 5). Other conventional means for measuring real-time engine speed may be used in the system, such as: a remote optical sensing device; a digital infrared phototachometer; photoelectric sensors with reflective tape; and vibrating reed tachometers. The invention is intended to be used with any means for measuring and transferring a value for engine speed to processor 24.

As illustrated in FIG. 5, the inputs to processor 24 are gear ratio, propeller pitch, propeller diameter, vessel speed, and engine speed. Processor 24 is programmed with an input display feature, wherein any one of the inputs, or the elapsed time supplied by the processor, may be displayed at a given time on input display screen 20. Button 14 may be pressed to display one input at a time in serial sequence until the desired input is displayed. For example, when button 14 is first pressed, processor 24 will cause elapsed time to appear on input display screen 20. When button 14 is pressed again, elapsed time will disappear from input display screen 20, and propeller pitch will be displayed on input display screen 20. In this manner, each of the inputs (elapsed time, propeller pitch, propeller diameter, gear ratio, engine speed, and vessel speed) can be displayed on input display screen, one at a time, in serial sequential order by repeatedly pressing button 14.

The output quantities are apparent slip and angle of attack. Processor 24 is programmed with the following algorithm to determine apparent slip:

$$SlipA = \{1 - [(1056 \times VMeasured)/(Sengine \times GR \times P)]\} \times 100\%;$$

where: SlipA=apparent slip in percent; VMeasured= measured speed of vessel 10 in miles per hour; SEngine= speed of engine 26 in revolutions per minute; GR=gear ratio (the ratio between the propeller rotational speed and SEngine, a dimensionless quantity); and P=pitch of the propeller blades in inches. VMeasured is supplied by pitot tube 32, pressure transducer 34, and processor 24, as described above, and SEngine is supplied by inductive pickup device 40 and processor 24 as described above.

Processor 24 is also programmed with the following algorithm to determine angle of attack in degrees:

$$\text{Angle of Attack} = \tan^{-1}[0.45 P/D] - \tan^{-1}[(480 VMeasured)/(GR \times SEngine \times D)];$$

where D=propeller diameter in inches. The remaining variables are defined above. Typically, angle of attack is most efficient between 3° and 5°.

During operation of vessel 10, inductive pickup device 40 and pressure transducer 34 provide a substantially continuous (up to ten times per second) feed of information to processor 24. Processor 24 uses the information to determine apparent slip and angle of attack on a substantially continuous and real-time basis. As seen in FIG. 5, for each determination of apparent slip and angle of attack, processor 24 sends the value for apparent slip and angle of attack to output display screen 22.

The substantially real-time display of apparent slip and angle of attack can be used to optimize vessel parameters, which include engine tilt and engine height with respect to vessel 10. During operation of vessel 10, the position of engine 26 may be changed using the tilting, raising, and lowering features described above and illustrated in FIG. 3, and the resultant change in apparent slip and angle of attack monitored, to find the optimal engine 26 setting for a given propeller 28.

Of course, there are many other parameters of a vessel which may be altered, and the system is intended to be used to determine the optimal settings of all parameters alone or in combination so that propeller 28 operates at optimal apparent slip and angle of attack for each vessel 10. Other vessel parameters include, but are not limited to vessel speed, trim, and vessel maneuvers (i.e., whether the vessel is traveling in a substantially straight line, or is turning). Each of these parameters can be altered while monitoring the apparent slip and angle of attack to determine how propeller apparent slip and angle of attack vary with each parameter.

It is another intended use of the system to test different propellers 28 and compare the various propellers' 28 performances. In this regard, the system can be used to determine which of a selection of propellers 28 operates at the optimal level of apparent slip and angle of attack for a given vessel 10. The system can also be used by propeller manufacturers to obtain test data for prototype propeller designs.

To compare apparent slip and angle of attack values, a first propeller 28 can be installed on engine 26, and vessel 10 can be piloted through a course on a body of water, while monitoring output display screen 22. Then a second propeller 28 can be installed on engine 26 and, leaving all vessel parameters constant, including the course through which the vessel is piloted, the apparent slip and angle of attack of second propeller 28 can be generally compared to the apparent slip and angle of attack of first propeller 28. Several propellers 28 may be tested in this manner to determine which propeller 28 performed with the lowest overall apparent slip and optimum angle of attack.

The system also includes a recording feature. Button 16 on face 30 of main console 12 can be pressed to begin and end a recording period. During a recording period, all input and output data, along with elapsed time provided by processor 24, are recorded in the memory of processor 24. Tests can be run during a recording period, such tests generally involving altering various vessel parameters. In the preferred embodiment of the invention, vessel speed would be steadily increased or held substantially constant during the recording period.

During the recording period, the system can be used to record information which can be used later to determine the optimal settings for various vessel parameters for a given propeller 28. For example, the speed of vessel 10 may be slowly increased or maintained at a substantially constant level during the recording period to determine apparent slip and angle of attack as a function of time and vessel speed. Also, vessel speed can be increased rapidly to determine how apparent slip and angle of attack of propeller 28 change as vessel 10 approaches top speed. All of this information is recorded during the recording period and can be analyzed later.

The recording feature may be used to compare apparent slip and angle of attack values for different propellers 28 in the same manner as described above, except button 16 is pressed before and after each propeller test. For example, to record a first propeller test, button 16 is pressed to begin a recording period, vessel 10 is then piloted through a given course with given vessel parameters, and button 16 is pressed again to end the recording period for that propeller. A second propeller is installed on engine 26, button 16 is again pressed to begin the second recording period, vessel 10 is piloted through the same course with the same vessel parameters, and button 16 is pressed again to end the second recording period. At this time processor 24 would have two recording periods stored in memory.

Other propellers may be tested in a similar manner until processor memory is full, at which time the stored data in processor memory is downloaded from main console 12 to a remote computer as described below. Then the data on the tested propellers 28 can be analyzed to determine which propeller 28 operates at the best value of apparent slip and angle of attack for a given vessel 10 and for given parameters.

The invention also includes a data downloading feature. Referring to FIG. 4, main console 12 is fitted with a serial port 70 associated with the rear surface 72 of main console 12. Serial port 70 communicates with a conventional data logger 46. See FIG. 5. If main console 12 is housed directly in the dashboard of vessel 10, serial port 70 may include an extension to facilitate access.

Data logger 46 may be used to download the data from processor memory into permanent storage in a computer. In the preferred embodiment, data logger 46 is connected to serial port 70 by a conventional serial cable 78, and button 18 is pressed to start data downloading. Alternative data loggers may be used, such as photo-optic data loggers that are aligned with a light port 80 (shown in broken lines in FIG. 4) on the main console 12 face. Such photo-optic data loggers do not require the serial port 70. The data, once downloaded and saved, may then be used to plot graphs to gain further insight into the performance of the tested propeller 28 or propellers 28. Once the stored data has been downloaded from processor memory, button 18 may again be pressed to clear processor memory so that the memory is available to store information from more tests.

The invention may be embodied in a remote controlled model airplane or boat. In such embodiments, the display screens 20, 22 may be provided on the remote control unit, or may be eliminated altogether. A laptop computer may be used to enter the manual inputs into the microprocessor. For these applications, the processor may automatically record the data without requiring a button to be pressed.

Another alternative embodiment is illustrated in FIG. 6, where the vessel is an airplane 100. The system in the airplane 100 includes similar components as described above with respect to the marine motor vessel 10, and those components are labeled with the same reference numerals. The airplane 100 may include more than one propeller 28 (e.g., dual propeller planes having wing-mounted engines 26 and propellers 28), and the microprocessor may be programmed to determine the average apparent slip and angle of attack for each of the propellers 28.

What is claimed is:

1. In an arrangement for determining apparent propeller slip wherein a motor and propeller are operatively associated with a vessel moving through a fluid medium under the influence of the propeller, the combination of
   a vessel speed measuring mechanism attached to said vessel and including a sensor exposed to the fluid medium and converting the action of the fluid medium against said sensor into an electrical signal,
   a motor speed measuring mechanism operationally associated with said motor for determining the revolutions per minute of said motor when under power, said motor speed measuring mechanism generating an electrical signal corresponding to the revolutions per minute of said motor,
   a console in said vessel including a microprocessor,
   operative connections between said sensor and said microprocessor and between said motor speed measuring mechanism and said microprocessor through which said electrical signals are transmitted to said microprocessor, said microprocessor incorporating algorithms for processing and converting said electrical signals to values for apparent propeller slip and propeller angle of attack.

2. The arrangement of claim 1, wherein said console includes a visual display, and wherein said microprocessor causes said values for apparent propeller slip and propeller angle of attack to be displayed on said visual display.

3. The arrangement of claim 1, wherein said console includes a visual display, and wherein said microprocessor causes said values for apparent propeller slip and propeller angle of attack to be displayed on said visual display on a substantially real-time basis.

4. The arrangement of claim 1, wherein said sensor is a pitot tube, said pitot tube being operatively connected to a pressure transducer, said pressure transducer operative to convert pressure in said pitot tube to an electrical signal.

5. The arrangement of claim 1, wherein said motor speed measuring mechanism is an inductive pickup device operatively connected to a spark plug wire of a spark plug in said motor.

6. The arrangement of claim 1, wherein said sensor is a pitot tube operatively connected to a pressure transducer and said motor speed measuring mechanism is an inductive pickup device operatively connected to a spark plug wire of a spark plug in said motor.

7. The arrangement of claim 1, wherein said console further includes a manual data entry button for selectively entering input data into said microprocessor.

8. The arrangement of claim 1, wherein said motor is an outboard motor including a tilting mechanism and a raising and lowering mechanism.

9. The arrangement of claim 1, wherein the vessel is an airplane.

10. The arrangement of claim 1, wherein the vessel is a remotley-controlled vessel.

11. A console for determining apparent propeller slip and propeller angle of attack of a propeller on a vehicle moving through a fluid medium, said console comprising:
   an input terminal for receiving an electrical signal corresponding to the speed of the vessel moving through the fluid medium,
   a second terminal for receiving an electrical signal corresponding to the motor speed of a motor for powering the propeller, and
   a microprocessor incorporating algorithms converting said first and second signals into a value corresponding to apparent propeller slip and a value corresponding to propeller angle of attack.

12. The console of claim 11, further comprising a visual display including an input display screen, and a switch operatively connected to said microprocessor, wherein manual actuation of said switch causes said processor to display one of said values at a time on said input display screen in serial sequence.

13. The console of claim 11, further comprising a display screen for displaying at least one of apparent slip and angle of attack on a substantially real-time basis.

14. The console of claim 11, further comprising a light port for use with a photo-optic data logger.

15. The console of claim 11, further comprising a serial port for use with a data logger.

16. A method for determining the apparent slip and angle of attack of a propeller, the method comprising:

(a) providing a vessel having a motor and a rotating propeller, the vessel being moved through a fluid medium under the influence of the rotating propeller;

(b) programming a processor with an algorithm for apparent slip and an algorithm for angle of attack, and manually inputting a value for motor gear ratio, propeller diameter, and propeller pitch into the processor;

(c) measuring the vessel speed and generating an electrical signal corresponding to the speed of the vessel;

(d) measuring the motor speed and generating an electrical signal corresponding to the revolutions per minute of said motor;

(e) transmitting the respective electrical signals to the processor;

(f) processing the electrical signals into values for vessel speed and motor speed; and (g) processing the values for gear ratio, propeller diameter, propeller pitch, vessel speed, and motor speed in accordance with the algorithms to determine apparent slip and angle of attack for the propeller.

17. The method of claim 16, further comprising (h) displaying the value for at least one of apparent slip and angle of attack on a display screen.

18. The method of claim 17, further comprising (i) selectively modifying vessel parameters prior to (c) and (d) and monitoring the resulting change in the displayed value after (h).

19. The method of claim 18, further comprising beginning a recording period prior to (b) and ending the recording period after (h) but before (i).

20. The method of claim 16, wherein (g) includes determining apparent slip and angle of attack for the propeller on a substantially real-time basis.

* * * * *